United States Patent [19]

Zausner

[11] Patent Number: 5,148,476

[45] Date of Patent: Sep. 15, 1992

[54] TELEPHONE ANTI-THEFT DEVICE

[75] Inventor: Fredrick Zausner, Port Washington, N.Y.

[73] Assignee: Wolder, Gross & Bondell, New York, N.Y.

[21] Appl. No.: 526,514

[22] Filed: May 21, 1990

[51] Int. Cl.$^5$ ........................................... H04M 17/00
[52] U.S. Cl. .................................... 379/437; 379/143; 379/440; 194/202
[58] Field of Search ............... 379/143, 437, 440, 145, 379/155; 194/202, 203, 204; 232/15, 57.5, 58, 66, 31

[56] References Cited

U.S. PATENT DOCUMENTS

| | | | |
|---|---|---|---|
| 2,716,882 | 9/1955 | Gill et al. | 70/159 |
| 3,213,210 | 10/1965 | Samples | 379/143 |
| 3,297,123 | 1/1967 | Hutchins | 195/350 |
| 3,391,256 | 7/1968 | Nawman | 379/451 |
| 3,833,104 | 9/1974 | Blum | 194/350 |
| 3,910,393 | 10/1975 | de Crepy | 194/350 |
| 4,267,411 | 5/1981 | Raines | 379/451 |

Primary Examiner—Stafford D. Schreyer

[57] ABSTRACT

A protective cover for the coinbox-containing portion of pay telephones of generally box-like construction, comprises a front panel flanked by a pair of parallel, rearwardly-extending side walls to define a generally U-shaped construction. The construction closely abuts the front and side panels of the telephone. The front panel is adapted to be permanently fastened to the coinbox cover of the telephone, such as by welding, and has an entryway to the telephone coin return slot and an integral raised portion positioned to overlie the top portion of the coin return door plate of the telephone.

4 Claims, 2 Drawing Sheets

TELEPHONE ANTI-THEFT DEVICE

The present invention relates to the mechanical arts, and in particular to a new and improved device intended to be utilized in conjunction with coin-operated, public telephones.

Damage due to vandalism of coin-operated telephones located in public places is substantial. In addition to the severing of wires to the phone and the removal of the handset, the fact that a coin-operated telephone can become the repository of a large number of coins makes the coinbox of the telephone a tempting target for robbery and vandalism. Efforts to strengthen the coinbox itself have met with only limited success, improvements in the strength of the box being limited by the nature and operation of the unit and normally being met with more aggressive techniques for the destruction of the telephone.

It has also been found that the coin return door is a target of such vandalism. While the doors are often designed to prevent the intentional jamming of the coin return path, to cause otherwise returned coins to be collected, followed by a release of the blockage to recover the coins, such doors are often disabled or removed by the vandal, who then replaces the door with a jamming device or a similar-appearing door which allows a jamming device to be used.

It is thus a purpose of the present invention to provide a protective shield for the coinbox and coin return path of pay telephones which provides increased security for the coinbox contents, as well as the coin return path.

Yet another purpose of the present invention is to provide such a device which may be utilized in connection with presently existing coin return, coinbox and telephone structures and which will not impede the normal and proper functioning of the telephone and the coin deposit and return mechanism.

BRIEF DESCRIPTION OF THE INVENTION

In accordance with the above and other objects, the present invention comprises a generally U-shaped plate of heavy gauge metal which overlies the bottom portion of the front surface of the telephone box, thus shielding the coinbox from entry. The sides of the device extend about the sides of the telephone, strengthening the structure and making it more difficult for the plate to be pried away from the box. The plate is fastened to the conventional coinbox cover plate in a tamper-proof, permanent manner and is provided with an appropriate opening to allow the cover plate lock key to be inserted when the coinbox is to be removed.

A significant feature of the present invention includes the provision of a raised portion on the front surface thereof to permit the coin return device to be activated in the normal manner. Accordingly, the coin return function is not compromised by the invention, while the invention provides increased protection for this otherwise vulnerable area, protecting the coin return door from tampering or removal.

BRIEF DESCRIPTION OF THE DRAWINGS

A fuller understanding of the present invention and the features and benefits thereof may be accomplished upon review of the following detailed description of a preferred, but nonetheless illustrative embodiment of the invention when taken in conjunction with the annexed drawings, wherein.

DETAILED DESCRIPTION OF A PREFERRED EMBODIMENT

Figure 1:
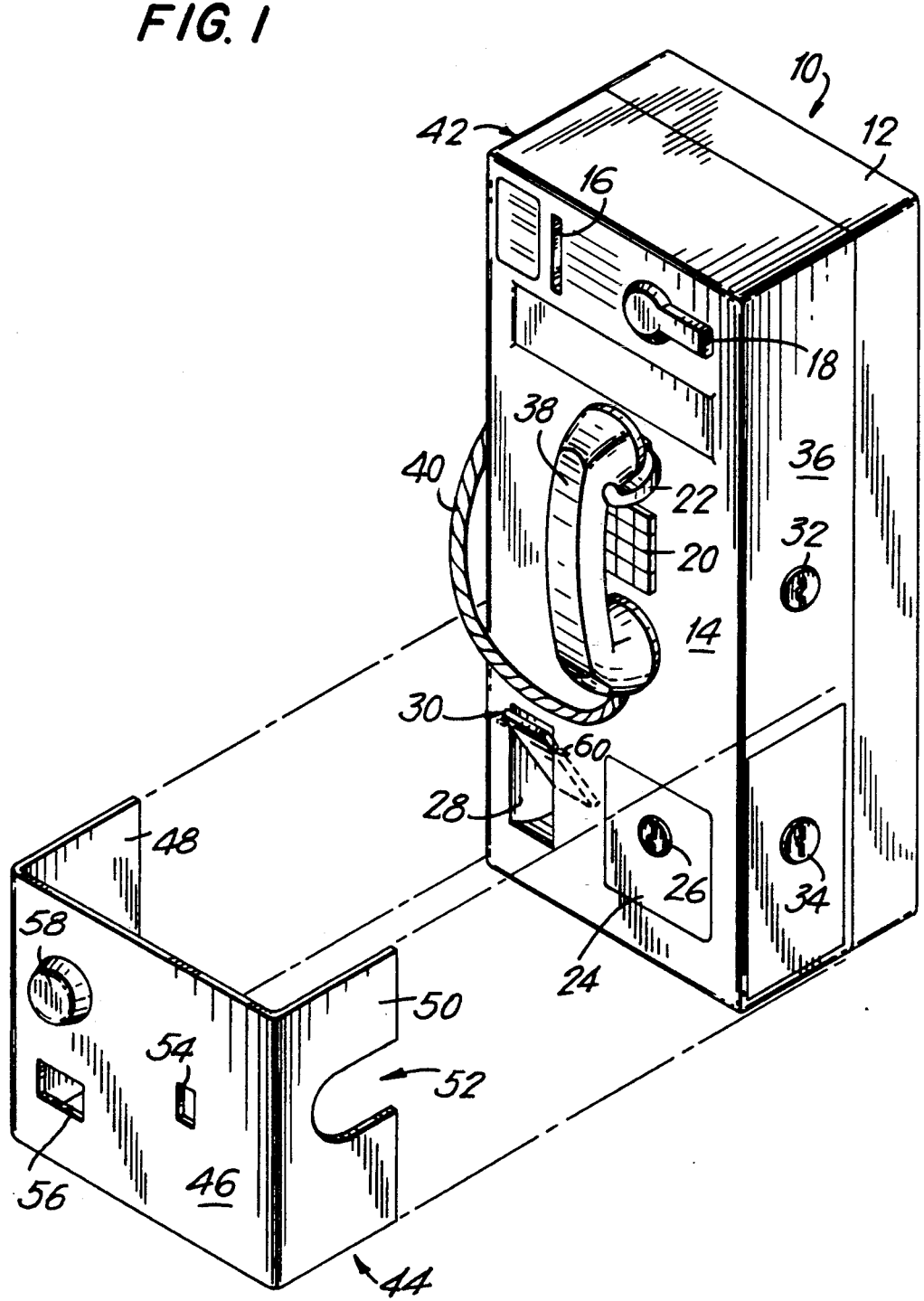
FIG. 1 is a perspective view of a typical coin telephone box with the protective cover of the invention shown displaced from the box, but in proper orientation for fitting thereon.

Referring initially to FIG. 1, pay telephone 10 is of conventional construction, and includes telephone box 12 having front panel 14 upon which coin slot 16, coin transport clearing lever 18, push-button array 20, headset cradle 22, coinbox access door plate 24, coinbox lock 26, coin return slot 28 and coin return slot cover 30 are located.

Additional key-operated lock elements 32 and 34 are located on a side 36 of the box to allow access to the unit's interior by authorized personnel, one of which locks, such as lock 34, normally functions in conjunction with coinbox lock 26 to allow access to the coinbox. A handset 38 rests in cradle 22, and is connected by cable 40, normally encased in a tamper-resistant shield to the third side 42 of the box.

The shield and protective plate 44 of the present invention is of generally U-shaped construction formed of heavy gauge metal, such as 0.145 inch thick stainless steel, having a front panel 46 flanked by side walls 48 and 50. The width of front panel portion 46 is such that side walls 48 and 50 closely embrace the sides 36 and 42 of the telephone box 12. The height of the plate is such that it fully overlies the lower portion of the telephone box 12, wherein the coinbox is located. As may be seen, side wall 50 is provided with a notch 52 adapted to allow access to the lock 34 and to permit the plate to be slid on and off the box 12 when a key is inserted into, and projects from the lock. An entranceway 54 is provided on the front panel 46 of the plate to allow access to coinbox lock 26.

Figure 2:
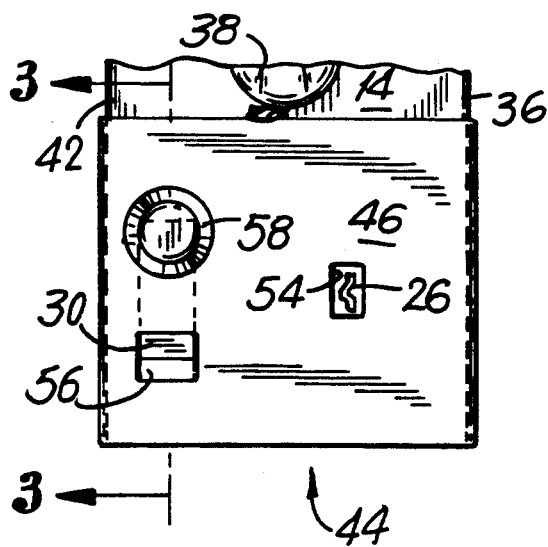
FIG. 2 is a partial front elevation view of the invention shown in place upon the phonebox body.
Figure 3:
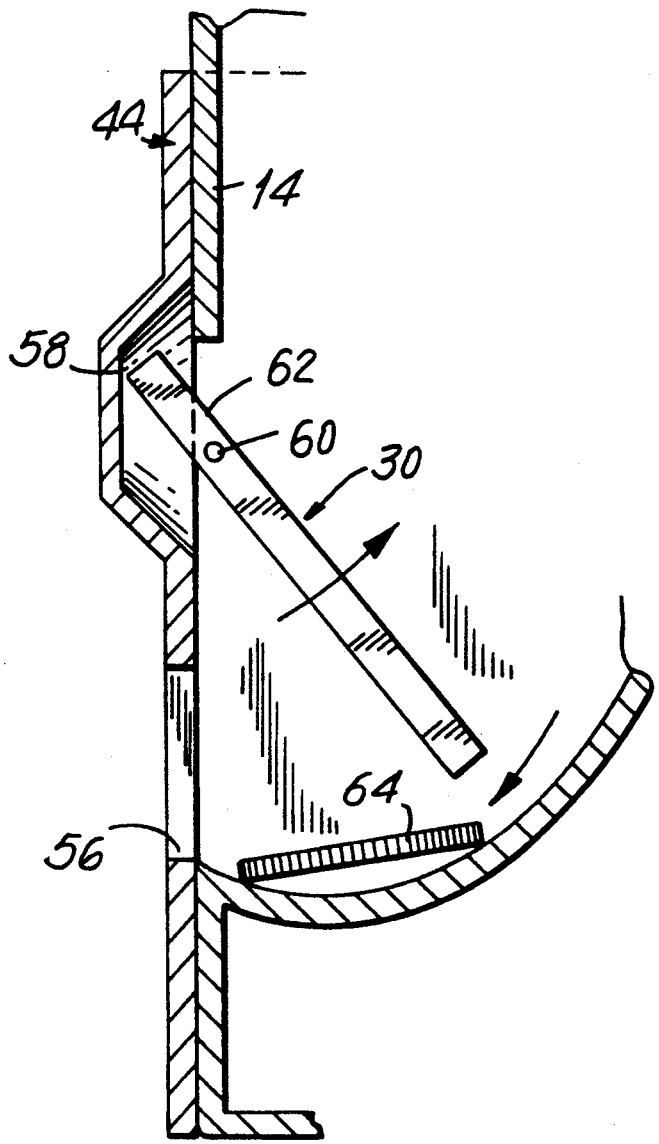
FIG. 3 is a partial section view taken along 3—3 of FIG. 2 detailing the construction of the cover to allow operation of the telephone coin return mechanism.

As further depicted in FIGS. 2 and 3 and, as detailed therein, the front panel 46 of protective plate 44 is further provided with an entryway 56, as well as a generally circular, raised portion 58 which allow the coin return mechanism, exemplified by the coin return slot and cover 28, 30 and clearing lever 18 to operate in the appropriate manner. The coin return mechanism of the telephone 10 includes a coin return slot cover 30 designed to pivot about pin 60 as shown in FIG. 3. This cover, which is shown in a generalized form in FIG. 3, is designed in part to foil attempts to direct wires and similar instrumentalities up through the coin slot 28 in an attempt to divert or otherwise retrieve inserted coins out through the slot. In operation, the upper portion 62 of the slot cover 30 pivots outwardly beyond the front surface 14 of the box when the lower portion of the cover is pushed inward to allow access to the interior of the coin return slot 28 and a returned coin 64.

Accordingly, front plate 46 has raised portion 58 which provides clearance for the upper portion 62 of the cover as it pivots outward. This raised portion, coupled with aperture 56 in the cover which is aligned with the lower portion of the coin return slot 28, allows full functioning of the coin return feature while providing security therefor. The raised portion 58 is preferably formed by a die forming process during cover fabrication.

Typically, the plate 44 is affixed, such as by welding, to the front of coinbox access plate 24. This retains the plate in position and allows it to be removed when the appropriate series of steps, including unlocking of the coinbox lock 26, occurs. Because the plate is affixed to the coinbox cover by welding, the plates can be fabricated and adapted to be used with boxes of otherwise conventional construction without great difficulty. The positioning of the elements on the front cover can be positioned during fabrication to accommodate differences which may appear in the location of the coinbox and coin return systems of telephone units of various manufacture. When in place, the plate provides maximum security for the coin storage and return portion of the telephone, while allowing full and proper operation of the unit.

What is claimed is:

1. A protective cover for the coinbox-containing portion of a pay telephone of generally box-like construction, comprising a front panel flanked by a pair of parallel, rearwardly-extending side wall panels to define a generally U-shaped construction, said construction adapted and arranged to closely abut the front and side panels of the telephone, said front panel being adapted to be permanently fastened to the coinbox cover of the telephone, and further having means located thereon to allow operation of and access to the coin return system of said telephone and to permit access to the coinbox removal means of said telephone.

2. The apparatus of claim 1, wherein said coin return access means comprises an entryway to the coin return slot and an integral raised portion of said front panel positioned to overlie the top portion of the coin return door plate of said telephone.

3. The apparatus of claim 2, wherein said coinbox removal means access means comprises a first notch in a side wall panel to expose a side-mounted lock on said telephone and a key entryway on said front panel aligned with the telephone coinbox lock.

4. The apparatus of claim 2, wherein said cover is fastened to said coinbox cover by welding.

* * * * *

UNITED STATES PATENT AND TRADEMARK OFFICE
CERTIFICATE OF CORRECTION

PATENT NO. : 5,148,476
DATED : September 15, 1992
INVENTOR(S) : Fredrick Zausner It is certified that error appears in the above-identified patent and that said Letters Patent are hereby corrected as shown below:

Patent Cover Page:

Assignee should be corrected to read:

--RESCO METAL PRODUCTS CORP., BROOKLYN, NEW YORK--

Signed and Sealed this

Eighth Day of April, 1997

*Attest:*

BRUCE LEHMAN

*Attesting Officer*     *Commissioner of Patents and Trademarks*